D. Gilson,
Artificial Leg.
N° 55,645. Patented June 19, 1866.
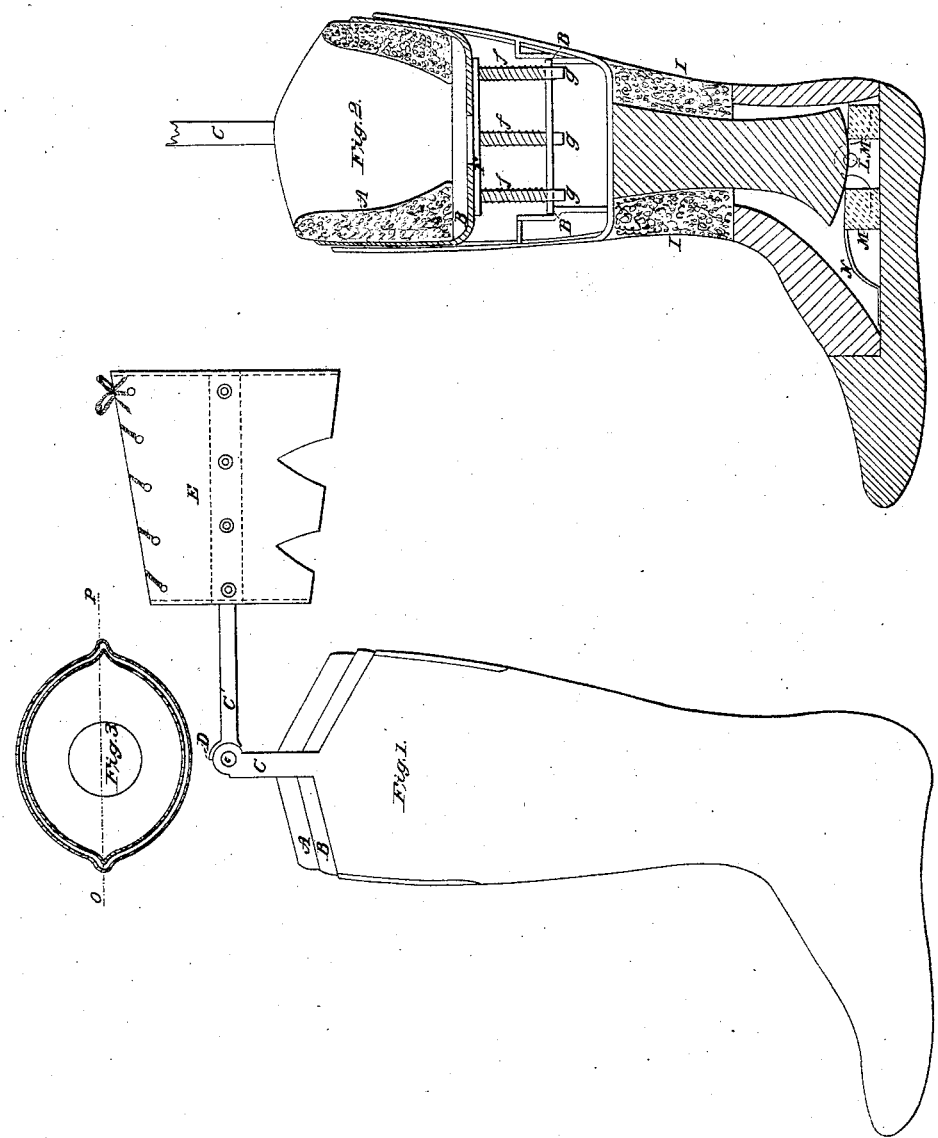

UNITED STATES PATENT OFFICE.

DAVID GILSON, OF NASHUA, NEW HAMPSHIRE.

IMPROVEMENT IN ARTIFICIAL LEGS.

Specification forming part of Letters Patent No. 55,645, dated June 19, 1866.

*To all whom it may concern:*

Be it known that I, DAVID GILSON, of the city of Nashua, county of Hillsborough, and State of New Hampshire, have invented and made new and useful Improvements in Artificial Legs; and to enable others skilled in the art to make and use my invention, I hereby declare that the following is a full and exact description thereof, reference being had to the accompanying drawings, forming a part of this specification, in which—

Figure 1 shows an elevation; Fig. 2, a section on the line O P, and Fig. 3 a top view of the adjustable socket with its directing ribs.

In place of the permanent and fixed socket in general use on artificial legs, I construct an adjustable sliding socket, B, into which is fitted the pad A, made of some soft and yielding material, and stuffed so as to fit the stump of the limb on which it is to be worn. This adjustable socket slides in grooves formed in the main shell of the leg, as shown at A, Figs. 1 and 3. It also rests upon the plate F, which is supported by springs, as shown $fff$, Fig. 2.

As the weight of the body is thrown upon this socket the springs yield and relieve the wearer from any jar or inconvenience that would be caused by the use of an unyielding or stiff material. It also gives the limb a more natural appearance. I also so connect that portion of the leg below the knee-joint with the sleeve E above the joint that a portion of the weight of the body may be supported by the sleeve E, thus relieving the stump from irritation by a too constant or hard usage.

I do not limit my claim to the particular form as herein shown, but extend it to any other substantially the same.

What I claim as my invention, and desire to secure by Letters Patent, is—

An adjustable socket or pad supported upon springs or their equivalent, for the purposes as herein set forth.

DAVID GILSON.

Witnesses:
   W. F. SPALDING,
   SAWYER JUNIER.